(12) United States Patent
Baloch et al.

(10) Patent No.: US 8,831,308 B2
(45) Date of Patent: Sep. 9, 2014

(54) SHAPE BASED CONDITIONAL RANDOM FIELDS FOR SEGMENTING INTRACRANIAL ANEURYSMS

(75) Inventors: Sajjad Hussain Baloch, Monmouth Junction, NJ (US); Erkang Cheng, Elkins Park, PA (US); Tong Fang, Morganville, NJ (US); Ying Zhu, Monmouth Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 223 days.

(21) Appl. No.: 13/456,542

(22) Filed: May 30, 2012

(65) Prior Publication Data

US 2012/0321169 A1 Dec. 20, 2012

Related U.S. Application Data

(60) Provisional application No. 61/497,700, filed on Jun. 16, 2011.

(51) Int. Cl.
*G06K 9/00* (2006.01)
*G06T 7/00* (2006.01)
*G06K 9/46* (2006.01)

(52) U.S. Cl.
CPC ..... *G06T 7/0083* (2013.01); *G06T 2207/20124* (2013.01); *G06T 2207/20076* (2013.01); *G06T 7/0089* (2013.01); *G06T 2207/30101* (2013.01); *G06K 9/468* (2013.01); *G06T 7/0087* (2013.01); *G06K 2209/05* (2013.01); *G06K 9/4638* (2013.01); *G06T 2207/10072* (2013.01)
USPC .......................................................... 382/128

(58) Field of Classification Search
None
See application file for complete search history.

(56) References Cited

U.S. PATENT DOCUMENTS

| 2008/0188962 A1* | 8/2008 | Suryanarayanan et al. .... 700/89 |
| 2010/0284587 A1* | 11/2010 | Malek et al. ................... 382/128 |
| 2010/0322525 A1* | 12/2010 | Kohli et al. .................... 382/226 |

* cited by examiner

*Primary Examiner* — Hadi Akhavannik

(57) ABSTRACT

A method for segmenting intracranial aneurysms in digital medical images includes extracting a mesh representing a vessel surface from a volumetric digital image, the mesh comprising a set of points $\{p_i\}$ and edges $\{e_{ij}\}$ respective points, and finding a set of binary labelings that minimizes an energy functional of the labelings and of shape descriptors of each point in the mesh, where the binary labelings segments an aneurysm from the surface by associating one of two labels with each point $p_i$, where a label indicates whether an associated point is on a vessel or on an aneurysm, where the energy functional includes a unary potential term summed over all points that represent a posterior distribution of the labels over the points, and a pairwise potential term summed over all edges that represents neighborhood labeling relationships.

25 Claims, 5 Drawing Sheets at selected vertices.

(a)      (b)      (c)      (d)

SHAPE BASED CONDITIONAL RANDOM FIELDS FOR SEGMENTING INTRACRANIAL ANEURYSMS

CROSS REFERENCE TO RELATED UNITED STATES APPLICATIONS

This application claims priority from "Shape based Conditional Random Fields for Segmenting Intracranial Aneurysms", U.S. Provisional Application No. 61/497,700 of Baloch, et al., filed Jun. 16, 2011, the contents of which are herein incorporated by reference in their entirety.

TECHNICAL FIELD

This disclosure is directed to methods for segmenting intracranial aneurysms in digital medical images.

DISCUSSION OF THE RELATED ART

Intracranial aneurysms are a major vascular disease in the brain, attributed to local weakening of the vessel wall. It manifests in the form of a bulging, known as a saccular aneurysm, or a dilation, known as a fusiform aneurysm. FIG. 1 depicts several examples of aneurysm 11. Intracranial aneurysms frequently occur near areas of high arterial curvature or bifurcations, as these regions that usually experience more hemodynamic stress. If left untreated, an aneurysm grows in size, thereby further weakening the wall strength and increasing the risk of rupture, which may lead to subarachnoid hemorrhage, neurological deficits, and, in up to 56% of cases, mortality. To prevent its growth and reduce the risk of rupture, surgical intervention is utilized, where stents, wire coils, and other embolic material or devices are placed not only to enforce the vessel wall, but also to alter the blood flow pattern, thereby reducing the pressure on regions more prone to rupture.

Once diagnosed, aneurysms are carefully monitored and examined, before making a surgical decision. To this end, geometry of aneurysm plays a crucial role. Studies have found strong correlations between the risk of rupture of intracranial aneurysms and various physical measurements on the aneurysms, such as volume, surface area, neck length, among others. Physicians analyze various measurements of geometric primitives evaluated on an aneurysm, which allows them to carry out surgical planning Accuracy of risk prediction relies on the accuracy of these quantities, which in turn, is determined by the precision of the underlying segmentation algorithm. Separation of the aneurysm from the healthy vessel, therefore, serves as a critical step, whose accuracy determines the eventual outcome in terms of surgical decisions, device selection, as well as patient recovery. This task is, however, challenging due to the complex topology and geometry of the underlying blood vessel, and its large inter-patient variation.

Early approaches on aneurysms separation mainly focused on deformable models. More recent approaches have utilized mesh based snakes for computer aided planning for endovascular treatment of intracranial aneurysms (CAPETA). However, these approaches are unable to adapt to topological changes in the aneurysm boundary, resulting in erroneous results for meshes with touching vessels, and due to the local nature of the snakes, fail to guarantee a globally optimal solution. Another approach is based on a graph-cut strategy for segmenting the 3D vessel mesh, guided by strong priors, which in turn were determined from user input in the form of 3 seed points. Due to its dependence on strong priors, the accuracy of this approach is determined by the accuracy of the prior computation algorithm, and remains highly sensitive to the manual user input. Also, in practical situations, the Gaussian curvature is too coarse to adequately capture underlying shape variations.

SUMMARY

Exemplary embodiments of the invention as described herein generally include methods and systems for segmentation of aneurysms from healthy vessels based on conditional random fields (CRF). Methods according to embodiments of the invention effectively combine two sources of information, patient specific strong priors in the form of user input, and data-driven shape priors learned from a large number of aneurysm examples. Along with strong prior obtained from user's interactive input, embodiments of the invention construct rich rotation invariant shape descriptors, and couple them with randomized decision trees to determine posterior probabilities. These probabilities define weak priors in the unary potentials, which are also combined with strong priors determined from user interaction. Pairwise potentials are used to impose smoothness as well as spatial ordering constraints. A descriptor according to an embodiment of the invention is independent of surface orientation, and is richer than existing approaches due to attribute weighting. The conditional probability of CRF is maximized through graph-cuts. Approaches according to embodiments of the invention have been validated with real datasets with respect to the groundtruth, resulting in the area overlap ratio of 88.1%, and can successfully address the issue of "touching vessel leaking".

According to an aspect of the invention, there is provided a method for segmenting intracranial aneurysms in digital medical images, the method including extracting a mesh representing a vessel surface from a volumetric digital image, the mesh comprising a set of points $\{p_i\}$ and edges $\{e_{ij}\}$ connecting respective points, and finding a set of binary labelings that minimizes an energy functional of the labelings and of shape descriptors of each point in the mesh, where the binary labelings segments an aneurysm from the surface by associating one of two labels with each point $p_i$, where a label indicates whether an associated point is on a vessel or on an aneurysm, where the energy functional includes a unary potential term summed over all points that represent a posterior distribution of the labels over the points, and a pairwise potential term summed over all edges that represents neighborhood labeling relationships.

According to a further aspect of the invention, the mesh is a triangular mesh.

According to a further aspect of the invention, the unary potential term comprises a weak unary prior and a strong unary prior, where the weak unary prior is learned from an vessel surface dataset of pathological vessels and an associated expert labeled groundtruth based on extracting shape descriptors from the pathological vessel surface dataset.

According to a further aspect of the invention, the shape descriptors comprise local descriptors that include one or more of a Gaussian curvature, a mean curvature, minimum and maximum principle curvatures, minimum and maximum principle directions, and a shape index, evaluated at each point of the mesh.

According to a further aspect of the invention, the shape descriptors comprise regional shape descriptors that include one or more of a Wilmore energy, a visibility indicator, a Gaussian curvature weighted point distribution shape context, a surface area shape context, and a connected components shape context, where the shape contexts are calculated using geodesic binning.

According to a further aspect of the invention, geodesic binning comprises computing the concentration of surface attributes within a bin to generate a histogram, where geodesic bins within a local neighborhood $G_r(p) := \{\forall q \in T : g(p,q) \leq r\}$ of a point p in mesh T, where g(p,q) is a geodesic distance between points p and q, are defined by $\{i=0, \ldots k-1 : g_i \leq g(p,q) \leq g_{i+1}\}$ with $g_k = r$, where the Gaussian curvature weighted point distribution shape context is computed from a number of points falling within each bin normalized by a total number of points in all bins, the surface area shape context is computed from a surface area of each bin, and the connected components shape context is computed from a number of connected components in each bin.

According to a further aspect of the invention, the strong unary prior is calculated by receiving a dome point, a proximal point, and a distal point, where the dome point $p_D$ provides an approximate location of the aneurysm relative to the vessel, and the proximal point $p_p$ and distal $p_d$ point specify a region of interest containing an aneurysm, projecting the proximal point $p_p$ and distal $p_d$ point to mesh points $\tilde{p}_p$ and $\tilde{p}_d$, using a geodesic h between mesh points $\tilde{p}_p$ and $\tilde{p}_d$ as a vessel prior, and simultaneously minimizing a distance between $\tilde{p}_p$ and $\tilde{p}_d$, and a mean curvature H along a path $h^*(\tilde{p}_p, \tilde{p}_d) := \arg\min_{h \in M} \int_{\tilde{p}_p}^{\tilde{p}_d} \phi(H) \pi(h(\tilde{p}_p, \tilde{p}_d)) dh$, where $\phi$ is a decreasing functional of the mean curvature H(h), and $\pi$ is a length of the geodesic, to determine a strong vessel prior, and finding a planar contour $C := T \cap P$ defined by an intersection between the mesh T and a plane P centered at the dome point $p_D$ with plane normal n defined as $$n := \frac{p_D - p_c}{\|p_D - p_c\|_2},$$

where $p_c$ is a closest point to the dome point $p_D$ on a vessel centerline between $p_p$ and $p_d$, where the planar contour is a strong aneurysm prior, where the strong unary prior includes the strong vessel prior and the strong aneurysm prior.

According to a further aspect of the invention, the method includes selecting a single connected component for the strong aneurysm prior, if one or more branching vessels touch the aneurysm, and decomposing the planar contour into a plurality of segments, and selecting a largest connected segment as the strong aneurysm prior, if the plane of the contour cuts across at a touching point where the planar contour includes both the aneurysm and a neighboring touching healthy vessel.

According to a further aspect of the invention, weak unary prior and the strong unary prior are combined into the unary potential according to $$-\log\phi_i(l_i, X; \theta) = \begin{cases} \gamma_3, & \text{if } p_i \in A_a \text{ and } l_i = l_v, \\ \gamma_4, & \text{if } p_i \in A_v \text{ and } l_i = l_a, \\ -\log\phi_i(l_i, X; \theta), & \text{otherwise,} \end{cases}$$

where $l_i$ is a label for point $p_i$ in mesh T, X is the set of shape descriptors for the mesh, $A_a$ is the strong aneurysm prior, $A_v$ is the strong vessel prior, $l_v$ is a vessel label, $l_a$ is an aneurysm label, $\gamma_3$, $\gamma_4$ respectively represent the vessel prior and aneurysm prior and are penalization costs for incorrect label assignments, $\phi_i$ is the weak unary prior at point $p_i$, and $\theta$ includes the parameters $\gamma_3$ and $\gamma_4$ with the posterior distribution parameters.

According to a further aspect of the invention, the pairwise potential is calculated by receiving a reference point $p_{ref}$ in the region $l_a$ that is a closest point projection of the dome point onto a surface of the aneurysm, and defining the pairwise potential $\psi_{ij}$ as $$-\log\psi_{ij}(l_i, l_j, X; \theta) = \begin{cases} \exp(\alpha(\kappa_i + \kappa_j)), & \text{if } l_i = l_j, \\ \exp(-\beta(\kappa_i + \kappa_j)) + \gamma_1, & \text{if } l_i \neq l_j, l_i = l_a, g(p_i, p_{ref}) \geq g(p_j, p_{ref}), \\ \exp(-\beta(\kappa_i + \kappa_j)) + \gamma_2, & \text{if } l_i \neq l_j, \end{cases}$$

where $l_i$, $l_j$ are labels for points $p_i$, $p_j$ in mesh T, X is the set of shape descriptors for the mesh, $\kappa_i$ and $\kappa_j$ denote the Gaussian curvature at points $p_i$, $p_j$, $g(p_i, p_{ref})$ is a geodesic distance between points $p_i$ and $p_{ref}$, $\gamma_1$ and $\gamma_2$ are empirically determined costs for assigning a vessel label $l_v$ to a point that is closer in geodesic distance sense to $p_{ref}$ than its neighbor with an aneurysm label $l_a$, and $\alpha$ and $\beta$ are exponential shaping coefficients, where $\theta$ combines the parameters $\alpha$, $\beta$, $\gamma_1$ and $\gamma_2$.

According to a further aspect of the invention, the energy functional is $$E(l \mid X) = -\sum_i \log\phi_i(l_i, X; \theta) - \sum_{(i,j)} \log\psi_{ij}(l_i, l_j, X; \theta),$$

where l is the set of binary labelings, X represents the shape descriptors for the mesh, $\theta$ represents a distribution parameter, $l_i$, $l_j$ are labels for points $p_i$, $p_j$ in mesh T, $\psi_{ij}$ is the pairwise potential between points $p_i$, $p_j$ in mesh T, and $\phi_i$ is the weak unary prior at point $p_i$.

According to another aspect of the invention, there is provided a method for segmenting intracranial aneurysms in digital medical images that includes extracting a mesh representing a vessel surface from a volumetric digital image, the mesh comprising a set of points $\{p_i\}$ and edges $\{e_{ij}\}$ connecting respective points, constructing appropriate local and regional shape descriptors x for each point that quantify geometric properties at each point and in regions about each point, estimating unary posterior probabilities $\phi_i$ for each point from the shape descriptors and from points received from user input, estimating a pairwise potential $\psi_{ij}$ for each connected pair of points $p_i$, $p_j$ based on a curvature for each point of the connected pair of points and a geodesic distance from each point to a reference point on an aneurysm, and minimizing an energy functional $$E(l \mid X) = -\sum_i \log\phi_i(l_i, X; \theta) - \sum_{(i,j)} \log\psi_{ij}(l_i, l_j, X; \theta)$$

to find a set of binary labelings l that segments the aneurysm from the surface by associating one of two labels with each point $p_i$, where a label indicates whether an associated point is on a vessel or on an aneurysm, X represents the shape descriptors for all points in the mesh, $l_i$, $l_j$ are labels for points $p_i$, $p_j$ in mesh T, and $\theta$ represents a distribution parameter.

According to a further aspect of the invention, the local descriptors include one or more of a Gaussian curvature, a mean curvature, minimum and maximum principle curvatures, minimum and maximum principle directions, and a shape index, and regional shape descriptors include one or more of a Wilmore energy, a visibility indicator, a Gaussian curvature weighted point distribution shape context, a surface area shape context, and a connected components shape context, where the local shape descriptors and regional shape descriptors are evaluated at each point of the mesh.

According to a further aspect of the invention, the shape contexts are calculated by defining geodesic bins within a local neighborhood $G_r(p):=\{\forall q \in T:g(p,q) \leq r\}$ of a point p in mesh T by $\{i=0, \ldots k-1: g_i \leq g(p,q) \leq g_{i+1}\}$ with $g_k=r$, where $g(p,q)$ is a geodesic distance between points p and q, and computing a concentration of surface attributes within a bin to generate a histogram, where the Gaussian curvature weighted point distribution shape context is computed from a number of points falling within each bin normalized by a total number of points in all bins, the surface area shape context is a surface area of each bin, and the connected components shape context is a number of connected components in each bin.

According to a further aspect of the invention, a unary posterior probability comprises a weak unary prior and a strong unary prior, where the weak unary prior is learned from an image dataset of pathological vessels and an associated expert labeled groundtruth based on extracting the shape descriptors from the pathological vessel image dataset, the strong unary prior includes a strong vessel prior and a strong aneurysm prior determined from the points received from user input, and the weak unary prior and the strong unary prior are combined into the unary posterior probability according to $$-\log \phi_i(l_i, X; \theta) = \begin{cases} \gamma_3, & \text{if } p_i \in A_a \text{ and } l_i = l_v, \\ \gamma_4, & \text{if } p_i \in A_v \text{ and } l_i = l_a, \\ -\log \phi_i(l_i, X; \theta), & \text{otherwise,} \end{cases}$$

where $l_i$ is a label for point $p_i$ in mesh T, X is the set of shape descriptors for the mesh, $A_a$ is the strong aneurysm prior, $A_v$ is the strong vessel prior, $l_v$ is a vessel label, $l_a$ is an aneurysm label, $\gamma_3$, $\gamma_4$ respectively represent the vessel prior and aneurysm prior and are penalization costs for incorrect label assignments, $\phi_i$ is the weak unary prior at point $p_i$, and $\theta$ includes the parameters $\gamma_3$ and $\gamma_4$.

According to a further aspect of the invention, the pairwise potential is calculated by receiving a reference point $p_{ref}$ in the aneurysm that is a closest point projection of a dome point received from user input onto a surface of the aneurysm, and defining the pairwise potential $\psi_{ij}$ as $$-\log \psi_{ij}(l_i, l_j, X; \theta) = \begin{cases} \exp(\alpha(\kappa_i + \kappa_j)), & \text{if } l_i = l_j, \\ \exp(-\beta(\kappa_i + \kappa_j)) + \gamma_1, & \text{if } l_i \neq l_j, l_i = l_a, g(p_i, p_{ref}) \geq g(p_j, p_{ref}), \\ \exp(-\beta(\kappa_i + \kappa_j)) + \gamma_2, & \text{if } l_i \neq l_j, \end{cases}$$

where $l_i$, $l_j$ are labels for points $p_i$, $p_j$ in mesh T, X is the set of shape descriptors for the mesh, $\kappa_i$ and $\kappa_j$ denote the Gaussian curvature at points $p_i$, $p_j$, $g(p_i, p_{ref})$ is a geodesic distance between points $p_i$ and $p_{ref}$, $\gamma_1$ and $\gamma_2$ are empirically determined costs for assigning a vessel label $l_v$ to a point that is closer in geodesic distance sense to $p_{ref}$ than its neighbor with an aneurysm label $l_a$, and $\alpha$ and $\beta$ are the exponential shaping coefficients, where $\theta$ includes the parameters $\alpha$, $\beta$, $\gamma_1$ and $\gamma_2$.

According to another aspect of the invention, there is provided a non-transitory program storage device readable by a computer, tangibly embodying a program of instructions executed by the computer to perform the method steps for segmenting intracranial aneurysms in digital medical images.

DETAILED DESCRIPTION OF EXEMPLARY EMBODIMENTS

Figure 1:
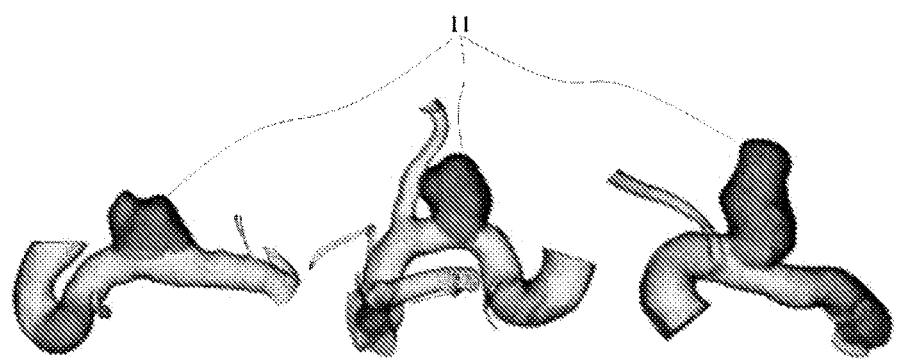
FIG. 1 depicts several examples of intracranial sidewall aneurysms, according to an embodiment of the invention.

Exemplary embodiments of the invention as described herein generally include systems and methods for segmenting aneurysms based on conditional random fields (CRF). Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-dimensional images and voxels for 3-dimensional images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-dimensional picture or a 3-dimensional volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image, or surfaces/meshes extracted from a digitized volumetric image.

Algorithms according to embodiments of the invention are directed to accurate strong prior determination. Unary potentials are decomposed into strong and weak priors. The former are determined from interactive user input, and the latter are estimated via randomized decision forest as posterior probabilities of novel shape descriptors. The shape descriptors, in turn, are constructed from underlying local and regional geometry. Pairwise potentials are encoded to impose spatial ordering as well as smoothness constraints. The conditional probability of CRF is maximized through graph-cuts. The effectiveness and accuracy of a method according to an embodiment of the invention is not limited by topological variations, but can construct shape descriptors specifically tailored for the task under consideration, i.e., for the separation of blob like aneurysms on tubular vessels. Inferencing from examples enables specifying weak priors, thereby allowing more flexibility. Smoothness and layout constraints penalize the assignment of inconsistent labels.

1. Conditional Random Fields

A robust aneurysm separation algorithm according to an embodiment of the invention is formulated using Conditional Random Fields (CRF) that are driven by rich shape descriptors.

Given a triangular mesh $T:=(P,E)$ representing a surface M embedded in $R^3$, with $P:=\{p_i=p(v_i)\}$ denoting the set of positions at vertices $V=\{v_i\}$, and $E=\{e_k\}$ denoting the edges connecting the respective vertices, $p: V \to P$, $v_i \mapsto p_i$, therefore, forms an isomorphism from the undirected graph $G:=(V,E)$ to T. The task under consideration is to find a binary labeling $l: V \to L=\{1_v, 1_a\}$, $v_i \mapsto l_i:=l(v_i)$ that partitions G into two segments. For the aneurysm separation task, this amounts to segmenting a mesh into the healthy vessel and the aneurysm regions, and is dictated by some feature properties of the underlying geometry.

Suppose $x_i$ defines a shape or geometric descriptor of $v_i$ in T possibly with a non-local region of support, then the isomorphism $x: V \to X$, $v_i \mapsto x_i:=x(v_i)$ captures the underlying geometric description of $v_i$ and the corresponding graph $X:=(x_i, e_i)$ may be exploited to find the partitioning. The optimal partition is the one that maximizes the joint distribution of (X, L):

$$l^* = \arg\max_l P(X,l;\theta) = \arg\max_l P(X;\theta)p(l|X;\theta) = \arg\max_l P(l|X;\theta) \quad (1)$$

where $\theta$ represents a distribution parameter. Conditional random fields allows one to simplify the above expression, by considering a local (1-ring) neighborhood $N(v_i)$ at each vertex, $v_i$:

$$P(l|X;\theta) = \frac{1}{Z(\theta, X)} \prod_i \phi_i(l_i, X; \theta) \prod_{(i,j)} \psi_{ij}(l_i, l_j, X; \theta), \quad (2)$$

where the unary potential, $\phi_i$, captures the posterior distribution of labels at $v_i$, and the pairwise potential, $\psi_{ij}$, models the neighborhood labeling relations that allow one to impose spatial constraints. Depending on the application, one may incorporate various constraints, such as smoothing or spatial ordering, in the form of soft layout consistency or hard layout consistency.

Figure 8:
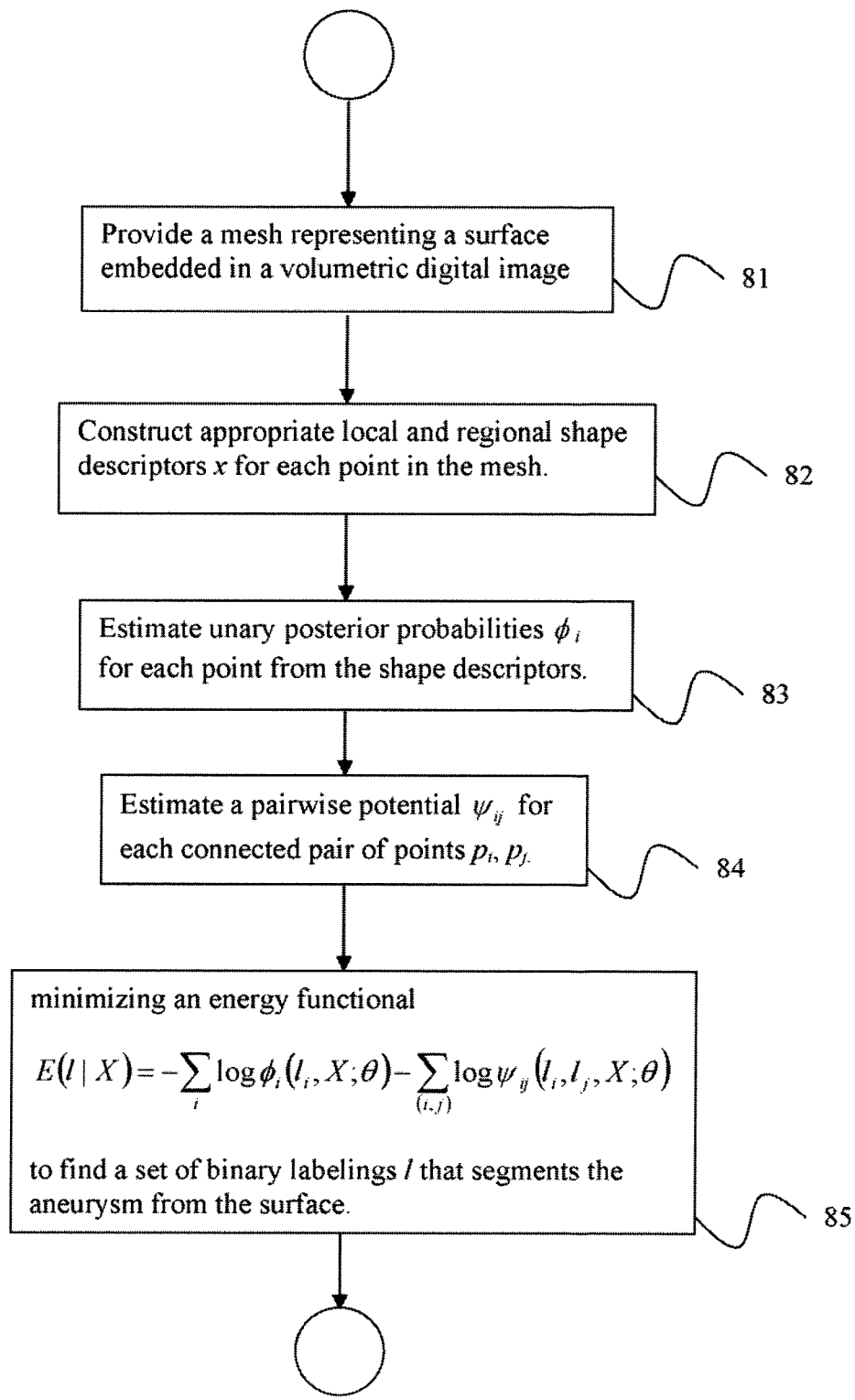
FIG. 8 is a flowchart of a CRF based aneurysm segmentation algorithm, according to an embodiment of the invention.

Referring now to the flowchart of FIG. 8, an aneurysm segmentation according to an embodiment of the invention can be summarized by extracting from a volumetric image dataset the mesh representing the surface embedded on the volumetric image dataset at step 81. The mesh representing the outer vessel surface extracted in step 81 is then used as the input to subsequent method steps according to embodiments of the invention. Next, at step 82, appropriate local and regional shape descriptors x are constructed that quantify geometric properties about each point of the mesh. At step 83, unary posterior probabilities are estimated for each point from the shape descriptors from user input points (step 83). According to embodiments of the invention, local and regional shape descriptors extracted from a dataset of surface meshes with manually labeled aneurysm and healthy parts are used to train a randomized decision tree. This randomized decision tree is used at step 83 as a model estimating the posterior probabilities. At step 84, a pairwise potential is estimated for each connected pair of points based on a curvature for each point and a geodesic distance from each point to a point on the aneurysm, and at step 85, EQ. (2) is maximized to find a suitable binary labeling that segments the aneurysm from the surface (step 85). Maximization of EQ. (2) is equivalent to the minimization of the following energy functional:

$$E(l|X) = -\sum_i \log\phi_i(l_i, X; \theta) - \sum_{(i,j)} \log\psi_{ij}(l_i, l_j, X; \theta). \quad (3)$$

2. Shape Descriptors

Embodiments of the invention are interested in separating blob like structures, such as aneurysms, from somewhat tubular regions, such as blood vessels. For each point $p_i$ on T, one extracts surface features, $F_i$, that are highly discriminating between these kind of regions. They include regional shape as well as local geometry.

2.1 Local Descriptors

Local descriptors rely on the curvature information, such as Gaussian curvature $\kappa$, mean curvature H, and maximum and minimum principal curvatures, $\kappa^1$ and $\kappa_2$. In addition, embodiments of the invention also consider maximum and minimum principal directions, $v_1$ and $v_2$, and the shape index, s:

$$s = \frac{2}{\pi}\arctan\frac{\kappa_2 + \kappa_1}{\kappa_2 - \kappa_1}, \kappa_2 \geq \kappa_1. \quad (4)$$

2.2. Regional Shape Descriptors

According to embodiments of the invention, regional shape information is captured through various shape descriptors, namely (1) the Wilmore energy, and (2) regional attribute weighted geodesic shape contexts.

The Wilmore energy of a vertex $v_i \in G$ is defined in terms of the isomorphism T, and its n-ring neighborhood, $S_i$:

$$W(p_i) := \int_{S_i}(H^2 - \kappa)dA, \quad (5)$$

where dA is a surface area element of $S_i$.

Note that $W(p_i) \leq 0$, with $W(p_i)=0$ if and only if $p_i$ is convex, and $v_i$ and all of its neighbors, $S_i$ lie on a common sphere. Consequently, big blob like structures, such as aneurysms, are characterized by a small Wilmore energy.

Figure 2:
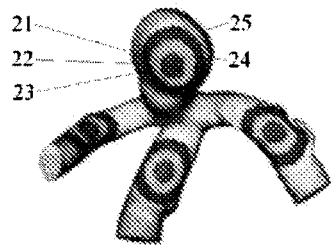
FIG. 2 illustrates geodesic binning at selected vertices, according to an embodiment of the invention.

Regional Attribute Weighted Geodesic Shape Contexts are defined by creating bins of various spatial parameters, followed by constructing a histogram that counts points falling in each bin. To ensure that descriptors are invariant with respect to surface orientation, geodesic binning for each point $p \in M$ is performed. FIG. 2 illustrates geodesic binning for several vertices, and the bands 21, 22, 23, 24, and 25 indicted for one vertex are the various iso-distance rings. Geodesic distances are intrinsic to a surface, and, therefore, lead to rotation invariance. If g(p,q) is the geodesic distance from point p to a point q, then geodesic binning, within a local neighborhood $G_r(p) := \{ \forall q \in T : g(p,q) \leq r \}$ is defined as $\{i=0, \ldots k-1 : g_i \leq g(p,q) \leq g_{i+1}\}$ with $g_k = r$. Histograms are then generated by computing the concentration of various surface attributes within each bin. According to embodiments of the invention, regional binning is performed instead of global binning. In the task under consideration, global binning can cause a confounding effect, as random branching across individuals introduces noise into the sample data. Furthermore, embodiments of the invention consider various histograms of diverse surface attributes, such as Gaussian curvature weighted point distribution, area distribution, and the distribution of connected components.

A first shape context according to an embodiment of the invention is the Gaussian curvature weighted point distribution shape context $f^g = (f_0^g, \ldots, f_{k-1}^g)$. The number of points falling within each bin is normalized by the total number of points in all bins to create a distribution. Finally each bin is weighted by the Gaussian curvature averaged within it. For meshes with non-uniform angulation, the discrete number of points does not truly represent the underlying geometry. For this reason, the feature set can be augmented by computing the surface area of each bin to create a second shape context distribution $f^a = (f_0^a, \ldots, f_{k-1}^a)$. It should be noted that this does not make the previous shape context redundant, since for non-uniform triangulation the point density is related to interesting features. Feature selection may be carried out later to retain the most distinguishing features.

A third and final shape context $f^c = (f_0^c, \ldots, f_{k-1}^c)$ according to an embodiment of the invention captures the number of connected components in each bin. This shape context helps differentiate flat or thick regions from narrow tubular areas. The hypothesis is that such a descriptor will help in segmenting a touching vessel from an aneurysm.

Due to their almost convex shape, most points on an aneurysm are visible from their centroid r. This allows one to consider a visibility indicator feature:

$$v_r(p) := \begin{cases} 1, & \text{if } p \text{ is visible from } r, \\ 0, & \text{otherwise.} \end{cases} \quad (6)$$

Since the centroid is not known a priori, its approximate location can be specified by a user as a reference point.

All these features are combined in a feature vector $F_p := (\kappa, H, \kappa_1, \kappa_2, s, v_1, v_2, W, f^g, f^a, f^c, v_r)$ as a local and regional descriptor of a point $p \in T$.

3. Potential Specification

After constructing the shape descriptors, one can specify unary potentials and pairwise potentials. Unary potentials are determined from the probability of an aneurysm and pairwise potentials are used to impose smoothness and layout constraints. According to an embodiment of the invention, the unary potentials are decomposed into strong and weak priors; the former is determined from the user input and latter incorporates posterior probabilities learned from shape descriptors. The term "strong" highlights high confidence, and hence, large weights for such priors.

Features of an approach according to an embodiment of the invention include: (1) rich shape descriptors; (2) the use of a CRF framework, which naturally encodes the posterior probabilities of aneurysm; (3) estimating weak prior unary potentials by randomized decision trees; (4) new robust algorithms for finding strong priors; and (5) smoothness and layout constraints in pairwise potentials.

3.1. Strong Unary Potentials

Figure 3:
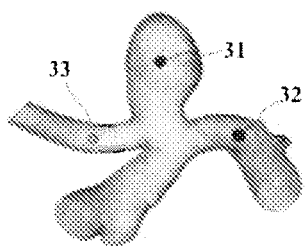
FIG. 3 illustrates several user provided reference inputs for the dome, proximal, and distal points, according to an embodiment of the invention.

According to an embodiment of the invention, to determine a strong prior, a user first specifies so-called dome, proximal and distal points as shown in FIG. 3, shown respectively as points 31, 32, and 33. The dome point $p_D$ very roughly provides the location of the aneurysm relative to the vessel, and proximal $p_p$ and distal $p_d$ points specify the region of interest for subsequent analysis in CAPETA. The aneurysm, therefore, always falls between the proximal and distal point input. It should be noted that these points do not lie on the surface, but are centered inside the vessel in the viewing direction. The closest point projection $\tilde{p}_D$ of $p_D$ is used as $p_{ref}$ in EQ. (10) in section 3.3, below, and $p_D$ is used as the reference point r for the visibility feature of EQ. (6).

Figure 4:
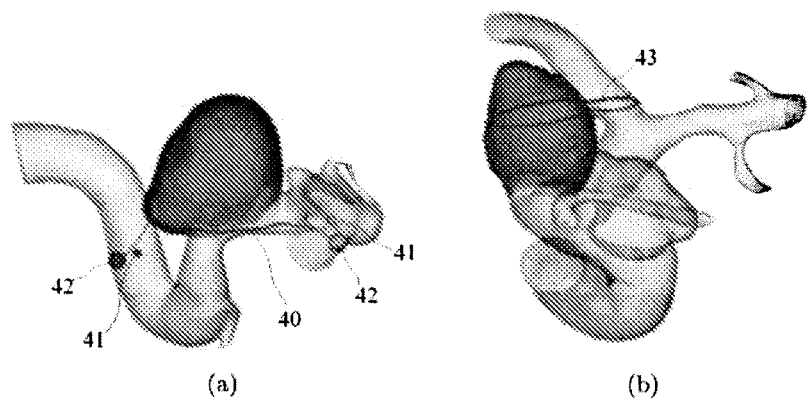
FIGS. 4(a)-(b) illustrates issues with prior art strong priors for a vessel and an aneurysm.
Figure 6:
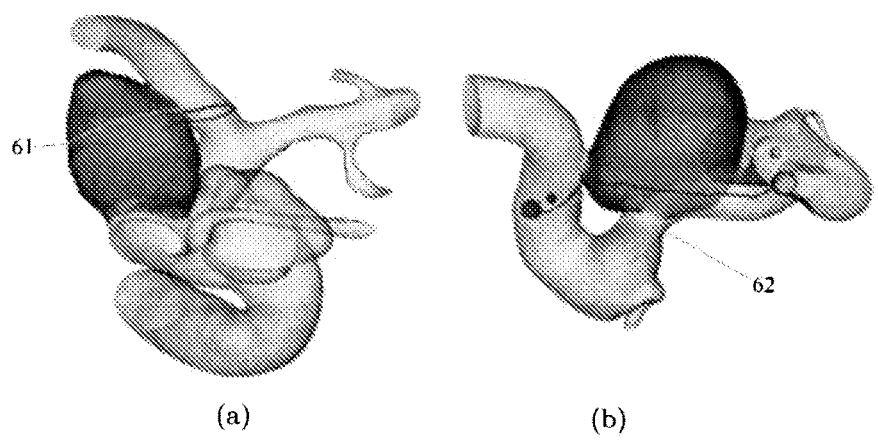
FIGS. 6(a)-(b) illustrates strong prior labels determined by methods according to embodiments of the invention for the cases of FIGS. 4(a)-(b).
Figure 7:
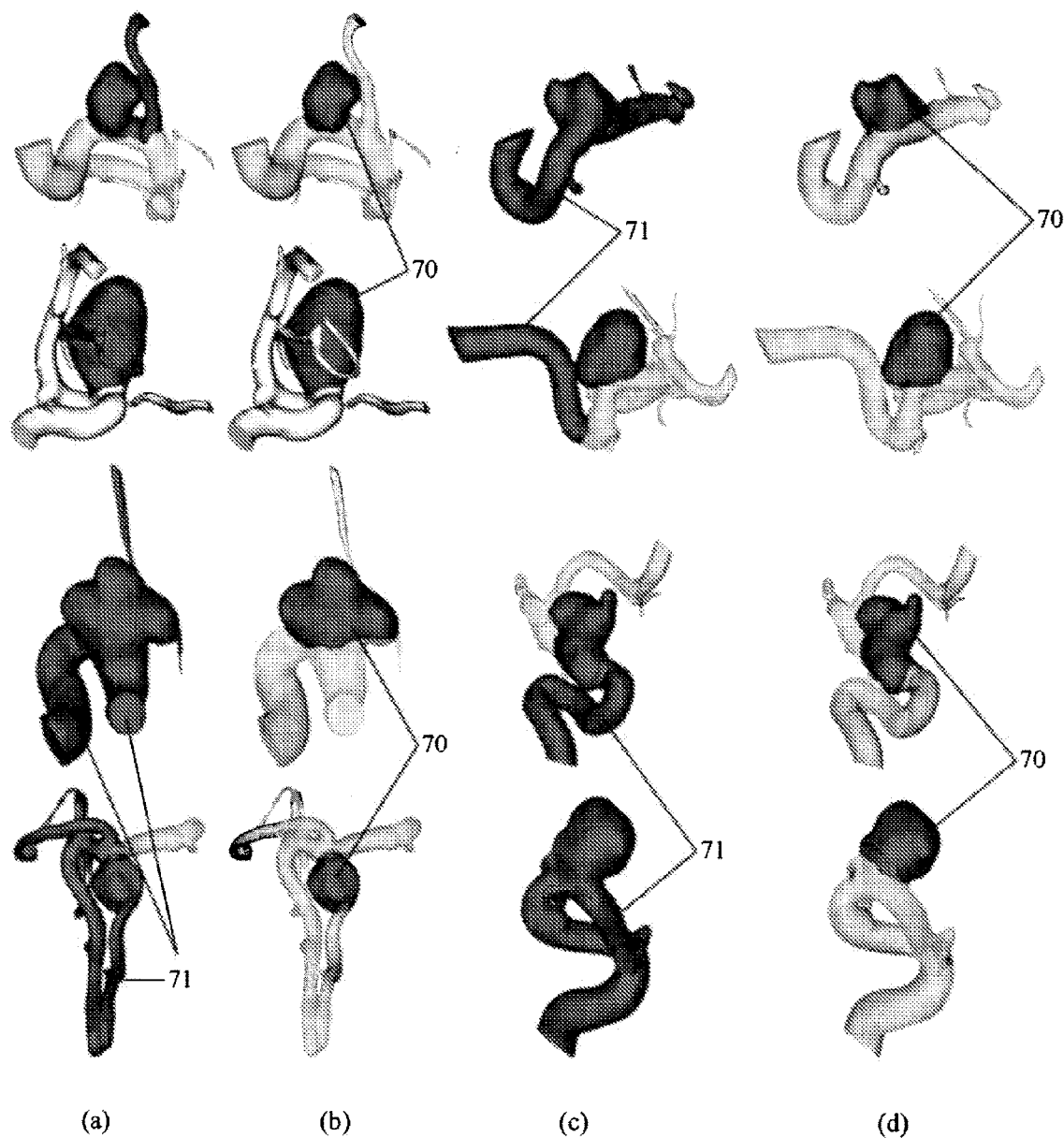
FIGS. 7(a)-(d) illustrate comparative results of other methods with methods according to embodiments of the invention.

Vessel Prior: According to an embodiment of the invention, these three points can be used for establishing strong priors in the unary potential. The strong prior for the vessel can be determined from the proximal $p_p$ and distal $p_d$ points, by projecting them to the mesh, $\tilde{p}_p$ and $\tilde{p}_d$, and then using the geodesic h between them as the vessel prior. However, the geodesic can touch the boundary between the aneurysm and the healthy vessel, therefore, leading to an incorrect specification of the strong vessel priors 40 as illustrated in FIG. 4(a). Note that in FIG. 4(a), small spheres 41 represent the reference points that lie inside the vessel, and big spheres 42 are the mapping of the references points to the vessel surface. Thus, according to an embodiment of the invention, the geodesic is enforced to stay away from the boundary. The optimal geodesic is the one that simultaneously minimizes the distance between $\tilde{p}_p$ and $\tilde{p}_d$, as well as the minimum mean curvature along the path:

$$h^*(\tilde{p}_p, \tilde{p}_d) := \arg\min_{h \in M} \int_{\tilde{p}_p}^{\tilde{p}_d} \phi(H) \pi(h(\tilde{p}_p, \tilde{p}_d)) dh, \quad (7)$$

where $\phi$ is a decreasing functional of mean curvature $H(h)$, and $\pi$ is the length of the geodesic. As shown in FIG. 6(b), the modified geodesic 62 leads to more reliable vessel prior $A_v$.

Aneurysm Prior:

The aneurysm prior can be based on a planar contour $C := T \cap P$ found as an intersection between T and a plane P centered at the dome point $p_D$. The plane normal n can be defined as the direction of a vector found as follows. First, the closest point $p_c$ to the dome point $p_D$ is determined on the vessel centerline between $p_p$ and $p_d$. n is then:

$$n := \frac{p_D - p_c}{\|p_D - p_c\|_2}. \quad (8)$$

Finally, the intersection contour is used as the strong prior for the aneurysm region. The utility of this prior is limited to the extent that there is only one intersection contour, which is usually not true. This issue can be resolved according to an embodiment of the invention by selecting the correct single connected component, in the case of touching vessels. In addition, the plane may cut across at the touching point, and the intersection contour may include both the aneurysm and the touching vessel part. According to an embodiment of the invention, the minimum principal curvature can be used to decompose the contour into various segments, and eventually the largest connected segment is used as the strong aneurysm prior $A_a$.

3.2. Weak Unary Potential

Weak unary potentials are learned from examples as the posterior distribution $\phi$ of shape descriptors. In general, $x_i$ can reside in some high dimensional space, and thus the learning process may be quite challenging. According to embodiments of the invention, given a dataset of pathological vessels, and the associated expert labeled groundtruth, a randomized decision forest is constructed for the classification, based on the extraction of the above mentioned shape descriptors. The randomized forests include built-in feature selection mechanisms, where maximum information gain is used for node splitting, and can avoid over-fitting without pruning. For test vessels, posterior probabilities are computed and used as weak priors.

The strong priors are incorporated into the unary potential as follows:

$$-\log \phi_i(l_i, X; \theta) = \begin{cases} \gamma_3, & \text{if } p_i \in A_a \text{ and } l_i = l_v, \\ \gamma_4, & \text{if } p_i \in A_v \text{ and } l_i = l_a, \\ -\log \phi_i(l_i, X; \theta), & \text{otherwise.} \end{cases} \quad (9)$$

where $A_v$ and $A_a$ represent the vessel prior and aneurysm prior, respectively, and $\gamma_3$, $\gamma_4$ represent the penalization costs for incorrect label assignments. EQ. (9) initially included only the weak prior $\phi$, to which an update in the form of the strong priors is introduced. Very high costs are assigned for penalize incorrect label assignments for the strong priors in which one has a high confidence. This means that for points on the mesh known to be "label values" with very high confidence, "strong priors" are used, as in the first two cases. For the rest of the mesh points, information is obtained from the training set of previously (manually) labeled examples. In short, the "strong priors" are allowed to switch labels but at a very high cost, whereas "weak priors" can switch labels at relatively low cost.

3.3 Pairwise Potential

To derive a pairwise potential, embodiments of the invention assume that a reference point $p_{ref}$ is given in the region $l_a$. As disclosed above in section 3.1, $p_{ref}$ is the closest point projection $\tilde{p}_D$ of $p_D$. A spatial layout constraint is then introduced that penalizes the assignment of $l_v$ to a vertex that is closer in geodesic distance sense to $p_{ref}$ than its neighbor with a label $l_a$. Similarly, the assignment of different labels to neighboring vertices is penalized to ensure a smoothness constraint:

$$-\log \psi_{ij}(l_i, l_j, X; \theta) = \quad (10)$$
$$\begin{cases} \exp(\alpha(\kappa_i + \kappa_j)), & \text{if } l_i = l_j, \\ \exp(-\beta(\kappa_i + \kappa_j)) + \gamma_1, & \text{if } l_i \neq l_j, l_i = l_a, g(p_i, p_{ref}) \geq g(p_j, p_{ref}), \\ \exp(-\beta(\kappa_i + \kappa_j)) + \gamma_2, & \text{if } l_i \neq l_j, \end{cases}$$

where $\kappa_i$ and $\kappa_j$ denote the Gaussian curvature at points $p_i$, $p_j \in T$. The exponential terms on the right hand side, therefore, penalizes the assignment of identical labels to neighboring vertices with high curvature edges. $\gamma_1$ and $\gamma_2$ are the costs assigned empirically or inferred from data. $\alpha, \beta > 0$ are exponential shaping coefficients. Note that $\alpha, \beta, \gamma_1$ and $\gamma_2$ are included among the parameters denoted by $\theta$.

Eventually segmentation is carried out by minimizing EQ. (3). An exemplary, non-limiting method of segmentation is the a-expansion algorithm.

4. Experiments

Experiments were performed to compare methods according to embodiments of the invention to methods discloses in Sgouritsa, et al., "Neck localization and geometry quantification of intracranial aneurysms", ISBI, pp. 1057-1060 (2010), the contents of which are herein incorporated by reference in their entirety. 3D Digital Subtraction Angiographic (DSA) images of 30 patients were acquired, and subsequently thresholded to extract the pathological vessels. 3D triangular meshes were constructed through marching cubes, and were then decimated using quadric decimation. An expert provided manual labeling on these meshes. Various features were computed to construct regional shape descriptors at each mesh vertex. Curvature estimates were based on an adaptive ball approach due to its robustness to noise. A 10-ring neighborhood was utilized for Wilmore energy, and 3 mm neighborhood was considered for computing geodesic shape contexts.

Figure 5:
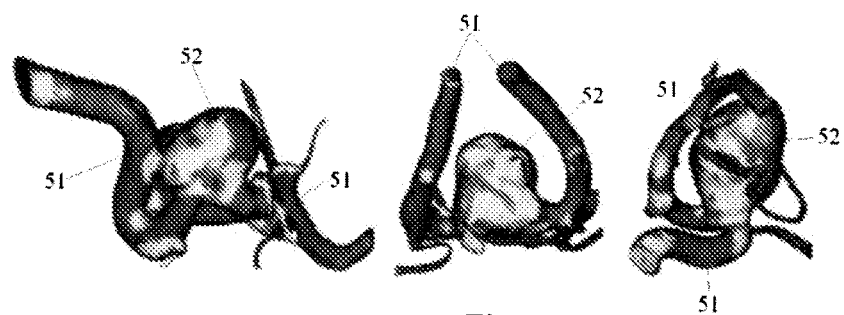
FIG. 5 illustrates some examples of posterior label probabilities, according to an embodiment of the invention.

Four cases were identified, where the methods of Sgouritsa, et al. had failed to provide reasonable results. These examples, along with four additional randomly selected meshes were considered as the test dataset. The remaining meshes were added to the training dataset, and training of a randomized forest of 60 trees was carried out, to compute coarse aneurysm separation and posterior estimates. Some examples of posterior label probabilities are shown in FIG. 5. Referring to FIG. 5, regions 51 (blue) are least likely to be an aneurysm and more likely to be a vessel, while regions 52 (red and yellow) are the regions most likely to be an aneurysm.

For the test cases, vessel and aneurysm labels for strong priors were determined as described above. For comparison, FIGS. 6(a)-(b) illustrates strong prior labels determined by methods according to embodiments of the invention for the cases of FIGS. 4(a)-(b). FIG. 6(a) depicts strong prior labels for an aneurysm, and FIG. 6(b) depicts strong prior labels for a vessel. Note that the modified aneurysm prior 61 does not go inside the touching vessel, and the vessel prior 62 stays away from aneurysm region.

The energy functional of EQ. (3) was minimized via two iterations of an α-expansion algorithm. A quantitative measure was defined as QM:=(A∩B)/(A ∪ B), where A is an automatic separation, whereas B is the groundtruth. $\gamma_1=3:5$; $\gamma_2=5$; $\gamma_3=\gamma_4=10^9$ in EQS. (9) and (10) were determined by maximizing QM via alternating variables. Results are shown in FIGS. 7(a)-(d), providing a qualitative comparison with the methods of Sgouritsa, et al. Specifically, FIGS. 7(a) and (c) show results from Sgouritsa, et al., while FIGS. 7(b) and (d) show results for methods according to embodiments of the invention. The aneurysms detected by embodiments of the invention are indicated by reference number 70. Overall, the average QM for a method according to an embodiment of the invention was computed to be 88.1%, compared with 73.0% for Sgouritsa, et al. In addition, Sgouritsa's, et al. issues with leakage 71 into the touching vessels are completely resolved by methods according to embodiments of the invention.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 9:
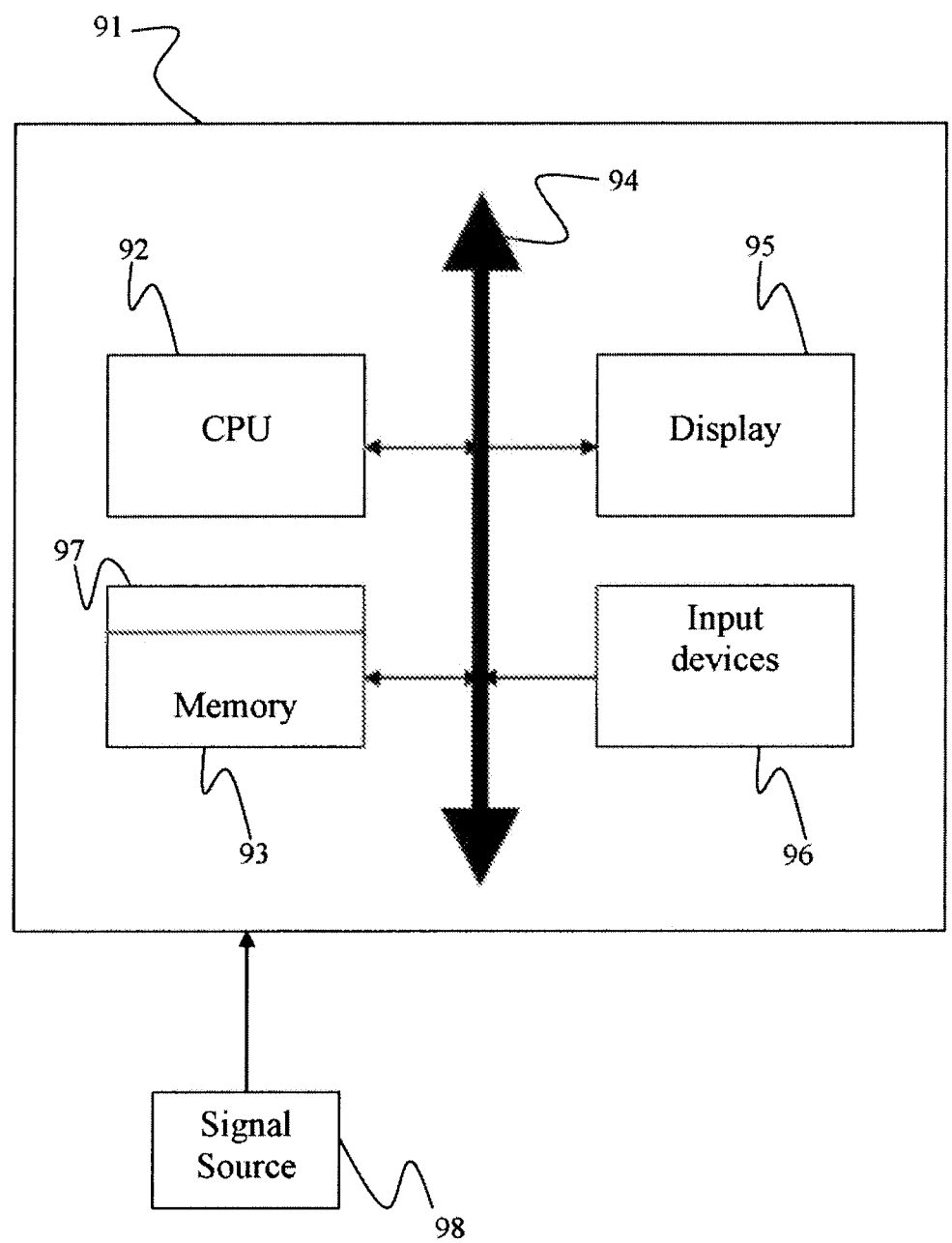
FIG. 9 is a block diagram of an exemplary computer system for implementing a method for segmenting aneurysms based on conditional random fields (CRF), according to an embodiment of the invention.

FIG. 9 is a block diagram of an exemplary computer system for implementing a method for segmenting aneurysms based on conditional random fields (CRF), according to an embodiment of the invention. Referring now to FIG. 9, a computer system 91 for implementing the present invention can comprise, inter alia, a central processing unit (CPU) 92, a memory 93 and an input/output (I/O) interface 94. The computer system 91 is generally coupled through the I/O interface 94 to a display 95 and various input devices 96 such as a mouse and a keyboard. The support circuits can include circuits such as cache, power supplies, clock circuits, and a communication bus. The memory 93 can include random access memory (RAM), read only memory (ROM), disk drive, tape drive, etc., or a combinations thereof. The present invention can be implemented as a routine 97 that is stored in memory 93 and executed by the CPU 92 to process the signal from the signal source 98. As such, the computer system 91 is a general purpose computer system that becomes a specific purpose computer system when executing the routine 97 of the present invention.

The computer system 91 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method for segmenting intracranial aneurysms in digital medical images comprising the steps of:

extracting a mesh representing a vessel surface from a volumetric digital image, said mesh comprising a set of points $\{p_i\}$ and edges $\{e_{ij}\}$ connecting respective points; and finding a set of binary labelings that minimizes an energy functional of the labelings and of shape descriptors of each point in the mesh, wherein the binary labelings segments an aneurysm from the surface by associating one of two labels with each point $p_i$, wherein a label indicates whether an associated point is on a vessel or on an aneurysm, wherein the energy functional includes a unary potential term summed over all points that represent a posterior distribution of the labels over the points, and a pairwise potential term summed over all edges that represents neighborhood labeling relationships, wherein the unary potential term comprises a weak unary prior and a strong unary prior, wherein said weak unary prior is learned from an vessel surface dataset of pathological vessels and an associated expert labeled groundtruth based on extracting shape descriptors from the pathological vessel surface dataset.

2. The method of claim 1, wherein the mesh is a triangular mesh.

3. The method of claim 1, wherein said shape descriptors comprise local descriptors that include one or more of a Gaussian curvature, a mean curvature, minimum and maximum principle curvatures, minimum and maximum principle directions, and a shape index, evaluated at each point of the mesh.

4. The method of claim 1, wherein said shape descriptors comprise regional shape descriptors that include one or more of a Wilmore energy, a visibility indicator, a Gaussian curvature weighted point distribution shape context, a surface area shape context, and a connected components shape context, wherein said shape contexts are calculated using geodesic binning.

5. The method of claim 4, wherein geodesic binning comprises computing the concentration of surface attributes within a bin to generate a histogram, wherein geodesic bins within a local neighborhood $G_r(p):=\{\forall q \in T: g(p,q) \leq r\}$ of a point p in mesh T, wherein $g(p,q)$ is a geodesic distance between points p and q, are defined by $\{i=0, \ldots k-1: g_i \leq g(p,q) \leq g_{i+1}\}$ with $g_k = r$, wherein said Gaussian curvature weighted point distribution shape context is computed from a number of points falling within each bin normalized by a total number of points in all bins, said surface area shape context is computed from a surface area of each bin, and said connected components shape context is computed from a number of connected components in each bin.

6. The method of claim 1, wherein said strong unary prior is calculated by receiving a dome point, a proximal point, and a distal point, wherein the dome point $p_D$ provides an approximate location of the aneurysm relative to the vessel, and the proximal point $p_p$ and distal $p_d$ point specify a region of interest containing an aneurysm, projecting the proximal point $p_p$ and distal $p_d$ point to mesh points $\tilde{p}_p$ and $\tilde{p}_d$ using a geodesic h between mesh points $\tilde{p}_p$ and $\tilde{p}_d$ as a vessel prior, and simultaneously minimizing a distance between $\tilde{p}_p$ and $\tilde{p}_d$ and a mean curvature H along a path $h^*(\tilde{p}_p, \tilde{p}_d) := \arg\min_{h \in M} \int_{\tilde{p}_p}^{\tilde{p}_d} \phi(H) \pi(h(\tilde{p}_p, \tilde{p}_d)) \, dh$, wherein $\phi$ is a decreasing functional of the mean curvature $H(h)$, and $\pi$ is a length of the geodesic, to determine a strong vessel prior, and finding a planar contour $C := T \cap P$ defined by an intersection between the mesh T and a plane P centered at the dome point $p_D$ with plane normal n defined as $$n := \frac{p_D - p_c}{\|p_D - p_c\|_2},$$

wherein $p_c$ is a closest point to the dome point $p_D$ on a vessel centerline between $p_p$ and $p_d$, wherein said planar contour is a strong aneurysm prior, wherein said strong unary prior includes said strong vessel prior and said strong aneurysm prior.

7. The method of claim 6, further comprising:

selecting a single connected component for the strong aneurysm prior, if one or more branching vessels touch the aneurysm, and decomposing the planar contour into a plurality of segments, and selecting a largest connected segment as the strong aneurysm prior, if the plane of the contour cuts across at a touching point wherein the planar contour includes both the aneurysm and a neighboring touching healthy vessel.

8. The method of claim 6, wherein said weak unary prior and said strong unary prior are combined into the unary potential according to $$-\log\phi_i(l_i, X; \theta) = \begin{cases} \gamma_3, & \text{if } p_i \in A_a \text{ and } l_i = l_v, \\ \gamma_4, & \text{if } p_i \in A_v \text{ and } l_i = l_a, \\ -\log\phi_i(l_i, X; \theta), & \text{otherwise,} \end{cases}$$

wherein $l_i$ is a label for point $p_i$ in mesh T, X is the set of shape descriptors for the mesh, $A_a$ is the strong aneurysm prior, $A_v$ is the strong vessel prior, $l_v$ is a vessel label, $l_a$ is an aneurysm label, $\gamma_3$, $\gamma_4$ respectively represent the vessel prior and aneurysm prior and are penalization costs for incorrect label assignments, $\phi_i$ is the weak unary prior at point $p_i$, and $\theta$ includes the parameters $\gamma_3$ and $\gamma_4$ with the posterior distribution parameters.

9. The method of claim 6, wherein said pairwise potential is calculated by receiving a reference point $p_{ref}$ in the region $l_a$ that is a closest point projection of the dome point onto a surface of the aneurysm, and defining said pairwise potential $\psi_{ij}$ as $$-\log\psi_{ij}(l_i, l_j, X; \theta) = \begin{cases} \exp(\alpha(\kappa_i + \kappa_j)), & \text{if } l_i = l_j, \\ \exp(-\beta(\kappa_i + \kappa_j)) + \gamma_1, & \text{if } l_i \neq l_j, l_i = l_a, g(p_i, p_{ref}) \geq g(p_j, p_{ref}), \\ \exp(-\beta(\kappa_i + \kappa_j)) + \gamma_2, & \text{if } l_i \neq l_j, \end{cases}$$

wherein $l_i$, $l_j$ are labels for points $p_i$, $p_j$ in mesh T, X is the set of shape descriptors for the mesh, $\kappa_i$ and $\kappa_j$ denote the Gaussian curvature at points $p_i$, $p_j$, $g(p_i, p_{ref})$ is a geodesic distance between points $p_i$ and $p_{ref}$, $\gamma_1$ and $\gamma_2$ are empirically determined costs for assigning a vessel label $l_v$ to a point that is closer in geodesic distance sense to $p_{ref}$ than its neighbor with an aneurysm label $l_a$, and $\alpha$ and $\beta$ are exponential shaping coefficients, wherein $\theta$ combines the parameters $\alpha$, $\beta$, $\gamma_1$ and $\gamma_2$.

10. The method of claim 1, wherein said energy functional is $$E(l | X) = -\sum_i \log\phi_i(l_i, X; \theta) - \sum_{(i,j)} \log\psi_{ij}(l_i, l_j, X; \theta),$$

wherein l is the set of binary labelings, X represents the shape descriptors for the mesh, $\theta$ represents a distribution parameter, $l_i$, $l_j$ are labels for points $p_i$, $p_j$ in mesh T, $\psi_{ij}$ is the pairwise potential between points $p_i$, $p_j$ in mesh T, and $\phi_i$ is the weak unary prior at point $p_i$.

11. A method for segmenting intracranial aneurysms in digital medical images comprising the steps of:
extracting a mesh representing a vessel surface from a volumetric digital image, said mesh comprising a set of points $\{p_i\}$ and edges $\{e_{ij}\}$ connecting respective points;
constructing appropriate local and regional shape descriptors x for each point that quantify geometric properties at each point and in regions about each point;
estimating unary posterior probabilities $\phi_i$ for each point from the shape descriptors and from points received from user input;
estimating a pairwise potential $\psi_{ij}$ for each connected pair of points $p_i$, $p_j$ based on a curvature for each point of said connected pair of points and a geodesic distance from each point to a reference point on an aneurysm; and
minimizing an energy functional $$E(l | X) = -\sum_i \log\phi_i(l_i, X; \theta) - \sum_{(i,j)} \log\psi_{ij}(l_i, l_j, X; \theta)$$

to find a set of binary labelings l that segments the aneurysm from the surface by associating one of two labels with each point $p_i$, wherein a label indicates whether an associated point is on a vessel or on an aneurysm, X represents the shape descriptors for all points in the mesh, $l_i$, $l_j$ are labels for points $p_i$, $p_j$ in mesh T, and $\theta$ represents a distribution parameter.

12. The method of claim 11, wherein local descriptors include one or more of a Gaussian curvature, a mean curvature, minimum and maximum principle curvatures, minimum and maximum principle directions, and a shape index, and regional shape descriptors include one or more of a Wilmore energy, a visibility indicator, a Gaussian curvature weighted point distribution shape context, a surface area shape context, and a connected components shape context, wherein said local shape descriptors and regional shape descriptors are evaluated at each point of the mesh.

13. The method of claim 12, wherein said shape contexts are calculated by defining geodesic bins within a local neighborhood $G_r(p) := \{\forall q \in T : g(p,q) \leq r\}$ of a point p in mesh T by $\{i=0, \ldots k-1 : g_i \leq g(p,q) \leq g_{i+1}\}$ with $g_k = r$, wherein $g(p,q)$ is a geodesic distance between points p and q, and computing a concentration of surface attributes within a bin to generate a histogram,
wherein said Gaussian curvature weighted point distribution shape context is computed from a number of points falling within each bin normalized by a total number of points in all bins, said surface area shape context is a surface area of each bin, and said connected components shape context is a number of connected components in each bin.

14. The method of claim 11, wherein a unary posterior probability comprises a weak unary prior and a strong unary prior, wherein said weak unary prior is learned from an image dataset of pathological vessels and an associated expert labeled groundtruth based on extracting the shape descriptors from the pathological vessel image dataset,
said strong unary prior includes a strong vessel prior and a strong aneurysm prior determined from the points received from user input, and
said weak unary prior and said strong unary prior are combined into the unary posterior probability according to $$-\log\phi_i(l_i, X; \theta) = \begin{cases} \gamma_3, & \text{if } p_i \in A_a \text{ and } l_i = l_v, \\ \gamma_4, & \text{if } p_i \in A_v \text{ and } l_i = l_a, \\ -\log\phi_i(l_i, X; \theta), & \text{otherwise,} \end{cases}$$

wherein $l_i$ is a label for point $p_i$ in mesh T, X is the set of shape descriptors for the mesh, $A_a$ is the strong aneurysm prior, $A_v$ is the strong vessel prior, $l_v$ is a vessel label, $l_a$ is an aneurysm label, $\gamma_3$, $\gamma_4$ respectively represent the vessel prior and aneurysm prior and are penalization costs for incorrect label assignments, $\phi_i$ is the weak unary prior at point $p_i$, and $\theta$ includes the parameters $\gamma_3$ and $\gamma_4$.

15. The method of claim 11, wherein said pairwise potential is calculated by receiving a reference point $p_{ref}$ in the aneurysm that is a closest point projection of a dome point received from user input onto a surface of the aneurysm, and defining said pairwise potential $\psi_{ij}$ as $$-\log \psi_{ij}(l_i, l_j, X; \theta) =$$

$$\begin{cases} \exp(\alpha(\kappa_i + \kappa_j)), & \text{if } l_i = l_j, \\ \exp(-\beta(\kappa_i + \kappa_j)) + \gamma_1, & \text{if } l_i \neq l_j, l_i = l_a, g(p_i, p_{ref}) \geq g(p_j, p_{ref}), \\ \exp(-\beta(\kappa_i + \kappa_j)) + \gamma_2, & \text{if } l_i \neq l_j, \end{cases}$$

wherein $l_i$, $l_j$ are labels for points $p_i$, $p_j$ in mesh T, X is the set of shape descriptors for the mesh, $\kappa_i$ and $\kappa_j$ denote the Gaussian curvature at points $p_i$, $p_j$, $g(p_i, p_{ref})$ is a geodesic distance between points $p_i$ and $p_{ref}$, $\gamma_1$ and $\gamma_2$ are empirically determined costs for assigning a vessel label $l_v$ to a point that is closer in geodesic distance sense to $p_{ref}$ than its neighbor with an aneurysm label $l_a$, and $\alpha$ and $\beta$ are the exponential shaping coefficients, wherein $\theta$ includes the parameters $\alpha$, $\beta$, $\gamma_1$ and $\gamma_2$.

16. A non-transitory program storage device readable by a computer, tangibly embodying a program of instructions executed by the computer to perform the method steps for segmenting intracranial aneurysms in digital medical images, the method comprising the steps of:

extracting a mesh representing a vessel surface from a volumetric digital image, said mesh comprising a set of points $\{p_i\}$ and edges $\{e_{ij}\}$ connecting respective points; and finding a set of binary labelings that minimizes an energy functional of the labelings and of shape descriptors of each point in the mesh, wherein the binary labelings segments an aneurysm from the surface by associating one of two labels with each point $p_i$, wherein a label indicates whether an associated point is on a vessel or on an aneurysm, wherein the energy functional includes a unary potential term summed over all points that represent a posterior distribution of the labels over the points, and a pairwise potential term summed over all edges that represents neighborhood labeling relationships, wherein said energy functional is $$E(l \mid X) = -\sum_i \log \phi_i(l_i, X; \theta) - \sum_{(i,j)} \log \psi_{ij}(l_i, l_j, X; \theta),$$

wherein l is the set of binary labelings, X represents the shape descriptors for the mesh, $\theta$ represents a distribution parameter, $l_i$, $l_j$ are labels for points $p_i$, $p_j$ in mesh T, $\psi_{ij}$ is the pairwise potential between points $p_i$, $p_j$ in mesh T, and $\phi_i$ is the weak unary prior at point $p_i$.

17. The computer readable program storage device of claim 16, wherein the mesh is a triangular mesh.

18. The computer readable program storage device of claim 16, wherein the unary potential term comprises a weak unary prior and a strong unary prior, wherein said weak unary prior is learned from an vessel surface dataset of pathological vessels and an associated expert labeled groundtruth based on extracting shape descriptors from the pathological vessel surface dataset.

19. The computer readable program storage device of claim 18, wherein said shape descriptors comprise local descriptors that include one or more of a Gaussian curvature, a mean curvature, minimum and maximum principle curvatures, minimum and maximum principle directions, and a shape index, evaluated at each point of the mesh.

20. The computer readable program storage device of claim 18, wherein said shape descriptors comprise regional shape descriptors that include one or more of a Wilmore energy, a visibility indicator, a Gaussian curvature weighted point distribution shape context, a surface area shape context, and a connected components shape context, wherein said shape contexts are calculated using geodesic binning.

21. The computer readable program storage device of claim 20, wherein geodesic binning comprises computing the concentration of surface attributes within a bin to generate a histogram, wherein geodesic bins within a local neighborhood $G_r(p) := \{\forall q \in T: g(p,q) \leq r\}$ of a point p in mesh T, wherein g(p,q) is a geodesic distance between points p and q, are defined by $\{i=0, \ldots k-1: g_i \leq g(p,q) \leq g_{i+1}\}$ with $g_k = r$, wherein said Gaussian curvature weighted point distribution shape context is computed from a number of points falling within each bin normalized by a total number of points in all bins, said surface area shape context is computed from a surface area of each bin, and said connected components shape context is computed from a number of connected components in each bin.

22. The computer readable program storage device of claim 18, wherein said strong unary prior is calculated by receiving a dome point, a proximal point, and a distal point, wherein the dome point $p_D$ provides an approximate location of the aneurysm relative to the vessel, and the proximal point $p_p$ and distal $p_d$ point specify a region of interest containing an aneurysm, projecting the proximal point $p_p$ and distal $p_d$ point to mesh points $\tilde{p}_p$ and $\tilde{p}_d$ using a geodesic h between mesh points $\tilde{p}_p$ and $\tilde{p}_d$ as a vessel prior, and simultaneously minimizing a distance between $\tilde{p}_p$ and $\tilde{p}_d$ and a mean curvature H along a path $h^*(\tilde{p}_p, \tilde{p}_d) := \arg\min_{h \in \mathcal{M}} \int_{\tilde{p}_p}^{\tilde{p}_p} \phi(H) \pi(h(\tilde{p}_p, \tilde{p}_d)) \, dh$, wherein $\phi$ is a decreasing functional of the mean curvature H(h), and $\pi$ is a length of the geodesic, to determine a strong vessel prior, and finding a planar contour $C := T \cap P$ defined by an intersection between the mesh T and a plane P centered at the dome point $p_D$ with plane normal n defined as $$n := \frac{p_D - p_c}{\|p_D - p_c\|_2},$$

wherein $p_c$ is a closest point to the dome point $p_D$ on a vessel centerline between $p_p$ and $p_d$, wherein said planar contour is a strong aneurysm prior, wherein said strong unary prior includes said strong vessel prior and said strong aneurysm prior.

23. The computer readable program storage device of claim 22, the method further comprising:

selecting a single connected component for the strong aneurysm prior, if one or more branching vessels touch the aneurysm, and decomposing the planar contour into a plurality of segments, and selecting a largest connected segment as the strong aneurysm prior, if the plane of the contour cuts across at a touching point wherein the planar contour includes both the aneurysm and a neighboring touching healthy vessel.

24. The computer readable program storage device of claim 22, wherein said weak unary prior and said strong unary prior are combined into the unary potential according to $$-\log\phi_i(l_i, X; \theta) = \begin{cases} \gamma_3, & \text{if } p_i \in A_a \text{ and } l_i = l_v, \\ \gamma_4, & \text{if } p_i \in A_v \text{ and } l_i = l_a, \\ -\log\phi_i(l_i, X; \theta), & \text{otherwise,} \end{cases}$$

wherein $l_i$ is a label for point $p_i$ in mesh T, X is the set of shape descriptors for the mesh, $A_a$ is the strong aneurysm prior, $A_v$ is the strong vessel prior, $l_v$ is a vessel label, $l_a$ is an aneurysm label, $\gamma_3$, $\gamma_4$ respectively represent the vessel prior and aneurysm prior and are penalization costs for incorrect label assignments, $\phi_i$ is the weak unary prior at point $p_i$, and $\theta$ includes the parameters $\gamma_3$ and $\gamma_4$ with the posterior distribution parameters.

25. The computer readable program storage device of claim 22, wherein said pairwise potential is calculated by receiving a reference point $p_{ref}$ in the region $l_a$ that is a closest point projection of the dome point onto a surface of the aneurysm, and defining said pairwise potential $\psi_{ij}$ as $$-\log\psi_{ij}(l_i, l_j, X; \theta) = \begin{cases} \exp(\alpha(\kappa_i + \kappa_j)), & \text{if } l_i = l_j, \\ \exp(-\beta(\kappa_i + \kappa_j)) + \gamma_1, & \text{if } l_i \neq l_j, l_i = l_a, g(p_i, p_{ref}) \geq g(p_j, p_{ref}), \\ \exp(-\beta(\kappa_i + \kappa_j)) + \gamma_2, & \text{if } l_i \neq l_j, \end{cases}$$

wherein $l_i$, $l_j$ are labels for points $p_i$, $p_j$ in mesh T, X is the set of shape descriptors for the mesh, $\kappa_i$ and $\kappa_j$ denote the Gaussian curvature at points $p_i$, $p_j$, $g(p_i, p_{ref})$ is a geodesic distance between points $p_i$ and $p_{ref}$, $\gamma_1$ and $\gamma_2$ are empirically determined costs for assigning a vessel label $l_v$ to a point that is closer in geodesic distance sense to $p_{ref}$ than its neighbor with an aneurysm label $l_a$, and $\alpha$ and $\beta$ are exponential shaping coefficients, wherein $\theta$ combines the parameters $\alpha$, $\beta$, $\gamma_1$ and $\gamma_2$.

* * * * *